April 4, 1961 W. L. FITE ET AL 2,978,603
PHOTON COUNTER
Filed Oct. 2, 1957
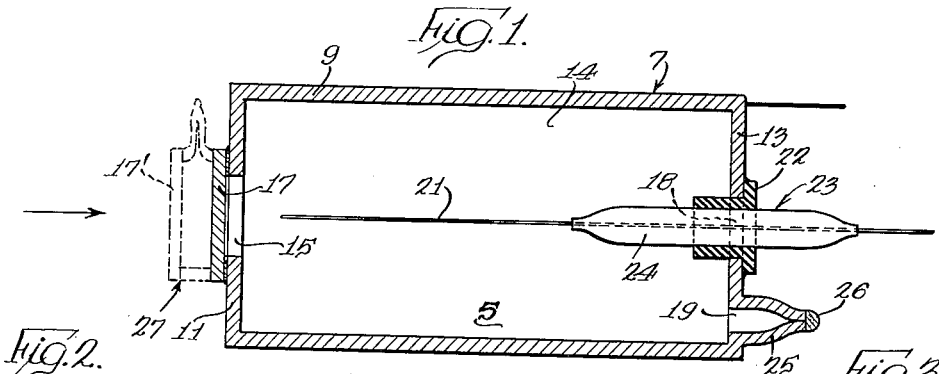
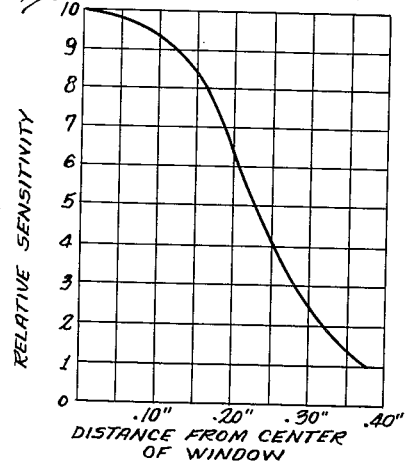
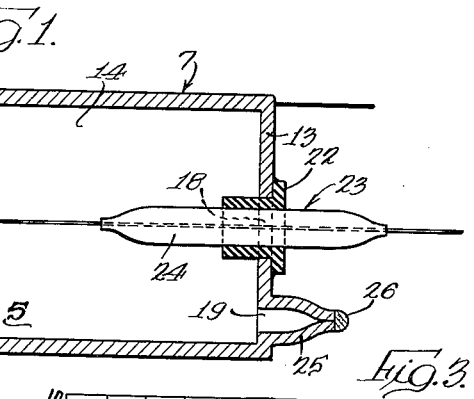
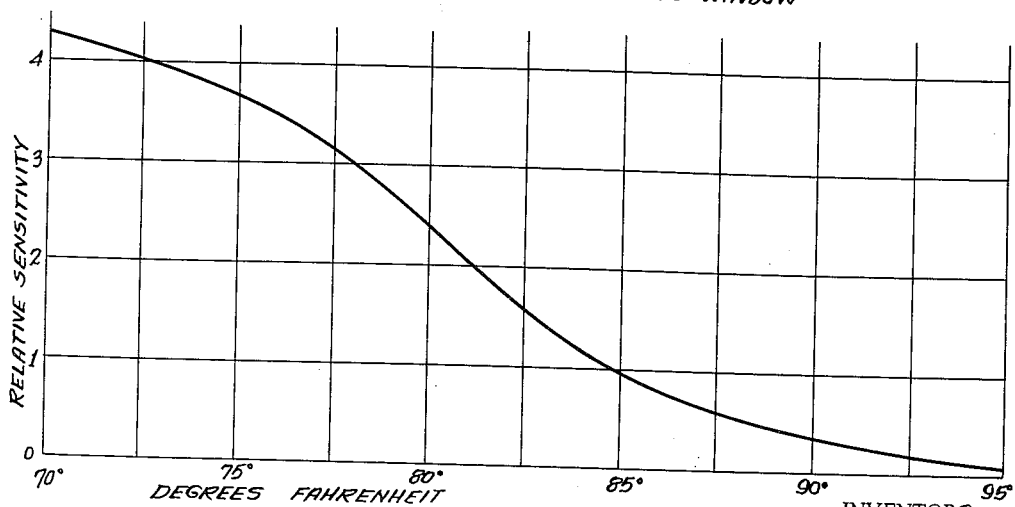
INVENTORS.
Wade L. Fite
Richard F. Brackmann

United States Patent Office 2,978,603
Patented Apr. 4, 1961

2,978,603
PHOTON COUNTER

Wade L. Fite, Encinitas, and Richard Theodore Brackmann, San Diego, Calif., assignors to General Dynamics Corporation, New York, N.Y., a corporation of Delaware Filed Oct. 2, 1957, Ser. No. 687,772

2 Claims. (Cl. 313—93)

The present invention relates generally to Geiger-Mueller photon counters and more particularly to a form of Geiger-Mueller counter which is selectively sensitive to ultra violet radiation within the wave length range of from about 1100 A. to about 1280 A. and which is especially adapted for use with an oxygen absorption cell for the counting of the Lyman alpha line of hydrogen radiation of wave length about 1216 A.

A Geiger-Mueller counter is a well known device for measuring electromagnetic radiation. Basically, it comprises a central anode wire surrounded by a cylindrical cathode, with the cathode either forming the outer enclosing wall of the counter tube or with both elements enclosed in a radiation permeable envelope, and a suitable ionizable gas or gas mixture within the counter.

In operation the Geiger-Mueller counter is connected to a source of potential of the order of 1000 or more volts. Radiation entering the tube causes ionization of a portion of the gas filling either directly in the gas or by causing emission of electrons from the cathode surface. When the potential across the tube elements is of the order of magnitude of about 300 to 1000 volts a chain of ionization occurs within the gas such that in a very short period of time the gas is discharged between the cathode and anode, resulting in a decreased potential between the tube elements. Suitable quenching means are provided, either by means of a quenching gas within the counter or by an external circuit, to de-ionize the gaseous filling and condition the counter for reuse.

Geiger-Mueller counters have been applied as a means for measuring radiation in the ultraviolet region of the spectrum. In such prior counters the ionizing action generally depends upon emission of photoelectrons from the cathode surface when activated by radiation in the ultraviolet region. Such counters require cathodes of suitable material which is photosensitive to ultraviolet radiation and a window of radiation permeable material so that the ultraviolet radiation can readily enter the tube.

A photon counter which is especially sensitive to vacuum ultraviolet radiations within the limited wave length range from about 1100 A. to about 1280 A., particularly Lyman alpha radiation of about 1216 Angstrom units would be a useful tool for the investigation of the Earth's upper atmosphere, vacuum spectroscopy, measurement of the work functions of metals by the inverse photoelectric effect, experiments on certain properties of the free hydrogen atom, particularly a study of excitation of Lyman alpha radiation by impact of electrons on hydrogen atoms, etc.

To be satisfactory for general use the counter must be stable in operation and capable of withstanding extreme stressing conditions such as might be incident to any experimental condition, such as, for example, rocket flights into the upper atmosphere. Unfortunately, a photon counter satisfying these rigid requirements has heretofore been unavailable.

A photon counter has now been discovered which is selectively sensitive only to a relatively narrow range of wave lengths of ultraviolet radiation, that is, radiation having a wave length of from about 1100 Angstrom units to about 1280 Angstrom units, and is adapted to effective counting of Lyman alpha radiation. The counter has the desired properties of simplicity of construction and durability and stability in use. The counter has been successfully utilized over extended periods of time without exhibiting any significant deterioration of sensitivity with counts and/or time, as in the case with certain conventional ultraviolet photon counters.

The highly selective ultraviolet photon counter of the present invention operates primarily by direct photoionization of a selected material in the gas phase, rather than by ionization as a result of the previously described photoelectric effect at the cathode, that is, ejection of photoelectrons from the photosensitized cathode to bring about the photoionization of the ionizable gas. In this connection, the counter of the present invention is constructed so that when the counter is operated the photoelectric effect is strongly suppressed. This is a desirable feature of the counter of the present invention, since impingement of photons on a photosensitive cathode would result in the operation of the counter over a broad spectral band of radiation, so that confusion in photon counting necessarily arises. In the selective ultraviolet photon counter of the present invention iodine vapor is utilized both as a quenching agent and the photoionizable gas and the electrodes of the counter are of materials which readily react with the iodine vapor to become relatively photo-insensitive while still effectively retaining their remaining electrical properties. Accordingly, the desired suppression of the photoelectric effect is achieved.

It has been found that iodine, in addition to its above-described advantages, has the further advantage of being chemically stable during extended use in the counter of the present invention. The iodine vapor does not undergo molecular rearrangement nor does it decompose, as is the case with various other quenching materials, so that the initially high sensitivity and selectivity of the counter is maintained during continued use of the counter, and the counter life is extremely long. The self-quenching properties of the counter are due to the ability of the iodine vapor to effectively absorb ultraviolet radiation and to capture slow electrons to form negative ions.

Iodine has an ionization potential corresponding to a wave length of about 1270 A. and the counter of the present invention may be utilized in conjunction with a selective wave length filter means which is transparent only to ultraviolet radiation of wave lengths above about 1100 A. for selectively detecting radiation between about 1100 A. and about 1270 A.

Accordingly, the primary object of the present invention is to provide an ultraviolet photon counter. Further objects of the present invention are to provide means for selectively detecting ultraviolet radiation within the wave length range of from about 1100 A. to about 1280 A.; to provide a simple to construct, self-quenching and durable yet sensitive ultraviolet counter employing a stable quenching agent, which counter is especially adapted for the detection of the Lyman alpha line of atomic hydrogen radiation; and to provide an ultraviolet photon counter which operates primarily by direct photoionization of a quenching vapor and in which the electrode photoelectric effect is strongly suppressed.

Further objects and advantages of the present invention will be apparent from a study of the following detailed description and accompanying drawings, of which:

Figure 1 is a sectional view of a preferred embodiment of the ultraviolet photon counter of the present invention;

Figure 2 is a graph depicting the relative sensitivity of the counter of Figure 1 with respect to the position of entry of normally incident radiation passing through the counter window;

Figure 3 is a graph depicting the relative sensitivity of the counter of Figure 1 with respect to the angle of incidence of radiation passing through the center of the counter window; and Figure 4 is a graph depicting the relative sensitivity of the counter of Figure 1 as a function of operating temperature of the counter when the gas mixture within the counter includes iodine vapor at about the saturated vapor pressure.

The Geiger-Mueller photon counter of the present invention is of the type generally referred to as an end window counter and includes a tubular body or container having an opening therein, a lithium fluoride window disposed in sealing relation across said opening to render the container gas-tight, a gas mixture disposed within said container, the gas mixture comprising an inert gas and iodine vapor at about its saturated vapor pressure, and a pair of spaced electrodes in contact with said gas mixture.

Now considering more particularly Figure 1 of the accompanying drawings, an ultraviolet photon counter 5 is illustrated, which comprises a hollow elongated generally cylindrical container 7 having a side wall 9 and end walls 11 and 13. Container 7 is utilized as the cathode in the illustrated photon counter. It is constructed of a suitable metallic material which does not exhibit any appreciable photoelectric effect or which will readily react with iodine vapor in the manner previously described, i.e., so that the photoelectric effect of the cathode will be strongly suppressed. For this purpose, container 7 is preferably fabricated of stainless steel, which metal has the desired structural strength, electrical conductivity and reactability with iodine vapor. However, other suitable metals may be utilized for this purpose, for example, nickel.

It is to be understood that container 7 need not be utilized as the cathode for the counter, in which event container 7 may be fabricated of any suitable material of high structural strength, electrical non-conductivity and durability, such as, glass, porcelain, or another ceramic. In such case, the material utilized for the cathode, which would then be located within the outer container, should have the requisite high electrical conductivity and capability of reacting with iodine to render it substantially insensitive to ultraviolet wave length photons.

Container 7 may be of any suitable size but is preferably relatively small as, for example, up to about 4 inches in length, with an average diameter of about one-half its length.

End wall 11 of the counter 5 is provided with an opening 15 therein which may be of any suitable shape as, for example, round, and which is preferably dimensioned so as to be somewhat smaller than a window 17 which is disposed completely across opening 15 and which is sealed to end wall 11 by any suitable substance, such as Apiezon wax, vacuum cement, resin adhesive or the like, or by any other means, for example, gasket seals, so as to render container 7 gastight.

End wall 13 is provided with two openings 18 and 19. Opening 18 is aligned centrally of end wall 13 and is sealingly connected by means such as soldering to the outer metallic portion 22 of a conventional glass to metal seal 23. The seal 23 includes an elongated central glass insulating section or sleeve 24 which supports an elongated axially disposed anode wire 21. Opening 19 provides access between the interior 14 of the container 7 and an outwardly extending tube 25 during the construction of the counter so that container 7 may be suitably evacuated and then filled with the desired gas mixture as hereinafter described. As shown in Figure 1, tube 25 has been sealed off by pinching the walls thereof together, cutting off that portion of the tube 25 beyond the pinched section, and then applying solder 26 to the pinched end of the tube.

The window 17 is formed of crystalline lithium fluoride which is transparent to ultraviolet radiations above about 1100 A. Window 17 is suitably dimensioned in relation to the opening 15 and may, for example, have a diameter of about 1 inch when the diameter of container 7 is about 2 inches and opening 15 is about ¾ of an inch. Window 17 for many purposes may comprise freshly cleaved crystalline lithium fluoride, while for other purposes it may be desirable to have the window optically finished.

A wire anode 21 is generally centrally positioned with respect to wall 9 and is of such length as to extend from a point outside the end wall 13 through opening 18 for a considerable distance into the interior of the container 7 along the longitudinal axis thereof. Anode 23 terminates a short distance from the window 17. The anode wire 21 is formed of suitable material such as tungsten and is at least about 0.040 inch in diameter so that the fields surrounding the anode during operation of the counter 5 will not be so strong as to lead to stripping of the negative ions produced during operation of the counter.

As illustrated in Figure 1, the insulating glass portion 24 of the seal 23 preferably extends into the interior of the counter a distance greater than the radius of the side wall 9 of the counter.

The counter 5 is preferably filled with between about one-quarter and about one atmosphere of inert gas, such as helium or argon and iodine vapor at about its saturated vapor pressure. A few crystals of iodine, in excess of that necessary to establish and maintain iodine vapor at saturated vapor pressure under operating temperatures for counter 5, are preferably located within the counter. Iodine vapor alone may be put in the counter for certain applications.

It is to be understood that the performance of the photon counter of the present invention will be influenced to some small extent by the geometry of its components and also by their composition. Accordingly, variations and modifications of such factors should be made with a view toward retaining to the fullest extent the improved performance characteristics of the counter.

Iodine in gaseous phase has a very high absorption coefficient (about 3,000 inverse centimeters at normal temperature and pressure), and high photoionization efficiency (about 42%). Iodine also has an ionization potential of 9.6 electron volts which corresponds to a wave length of about 1270 A. Iodine is therefore capable of readily photoionizing in the presence of wave lengths shorter than 1270 A. such as Lyman alpha radiation. Moreover, iodine has been found to be completely chemically stable and wholly suitable for use where utilized in conjunction with an inert gas.

Iodine has the advantage of being electronegative in both the atomic and molecular forms, and thereby acts as an excellent quenching agent. In this connection, the electron affinity of the iodine atom is greater than the dissociation energy of the iodine molecule, so that the following reaction is exoergic and rapid:

$$I_2 + e \rightarrow I^- + I$$

As previously indicated the iodine vapor reacts with certain metals forming the cathode so as to strongly suppress the previously described photoelectric effect at the cathode. After construction such counters are aged over a period of about two weeks to permit the iodine to react with the cathode to the desired extent.

The sensitivity of counter 5 of the present invention can be suitably varied by changing the distance between the anode 21 and the lithium fluoride window 17. For a high sensitivity counter, such distance should be kept as small as possible. However, the distance should not be so short that ions from the counting discharges strike window 17 in great numbers, since this will produce a deleterious change in the lithium fluoride, rendering the counter slightly responsive to visible light, although it will not appreciably affect its ultraviolet response characteristics. Also, the greater the distance of anode 21 from window 17 the greater will be the effect of operating temperature on the sensitivity of the counter. Photons absorbed in the space between the window and the active region of the counter can give no counts, the number absorbed depending upon the density of the iodine vapor in that region. The density of the iodine vapor is directly related to the temperature, the higher the temperature the higher the vapor pressure and iodine density for those counters containing crystalline iodine. Accordingly, as the temperature of the counter is increased, the sensitivity of the counter decreases, apparently due to increased photon absorption in the region between window 17 and the electrodes. The sensitivity decrease with temperature increase is also apparently due in part to increased capture of electrons by the iodine vapor to form negative ions. Above 100° F. the second process appears to remove virtually all free electrons made by photoionization of the iodine and the counter ceases to function. For most purposes, the distance between window 17 and anode 21 should be between about one-fourth and one cathode diameter.

The effect of increasing temperature on the sensitivity of the counter is graphically illustrated in Figure 4 for a counter filled with a gas mixture which includes iodine vapor at about its saturated vapor pressure. The relative sensitivity of a typical counter constructed in accordance with the present invention is shown plotted against various temperatures within the range of from 70° F. to 95° F. It will be seen that the relative sensitivity of the counter rapidly decreases as the operating temperature increases beyond about 78° F., and at 95° F. is only about 1/40 that at 70° F.

As the temperature of the counter is decreased, the counting efficiency increases. However, at temperatures below about 60° F. the density of the iodine vapor is so low that the counter ceases to be self-quenching. Accordingly, external quenching must be employed below about 60° F. in order to effectively operate the counter. Such external quenching will extend the temperature range down to a few degrees. However, the rapid decrease of density of iodine vapor below 60° F. rapidly decreases the ability of the counter to trap and count the photons of incident ultraviolet radiation so that the counting efficiency eventually drops below a practical level. The practical operating temperature range for the counter without auxiliary quenching means is between about 60° F. and about 100° F., with preferred operating temperatures near the lower end of the range, between about 60° F. and 78° F. It should be noted that the counter of itself during operation does not appreciably warm or cool, but that the temperatures referred to are those solely induced by the environment in which the counter is operated.

The position of entry of normally incident radiation on window 17 and the angle of incidence of radiation arriving at the center of window 17 also influence to some extent the relative sensitivity of the counter. The effects are graphically illustrated in Figures 2 and 3 of the accompanying drawings, for a typical counter having a one inch diameter lithium fluoride window. As is seen from Figure 2, the sensitivity of the counter decreases relatively rapidly as the distance of normally incident radiation entering the window increases from the center of the window. Moreover, as the angle of incidence for radiation arriving at the center of the window increases from normal, again the sensitivity of the counter rapidly decreases.

The counter of the present invention has been found to have high counting stability and reliability in use. In this connection, the quantum efficiency for one such counter under given operating conditions has shown no measurable changes after the counter has been in almost continuous use for a period of 8 months. It appears that the useful life of the counter of the present invention is very long.

The operating characteristics of the counter of the present invention are wholly satisfactory for its intended purposes. In this connection, the counter has a pulse rise time of less than about 0.5 microsecond and a pulse length of about 5 microseconds, a so-called "dead" time of about 100 microseconds, and a recovery time of about 300 microseconds. When the counting efficiency is plotted graphically as a function of voltage changes in the counter of the present invention, the graph shows a sharp rise in counting efficiency as the voltage increases. This is followed by a "plateau." For example, a "plateau" having a slope of about 15 percent per 100 volts and a length of about 200 volts was obtained for a counter having its "plateau" centered about 600 volts. The background count on a completely blacked out counter of this type is about 4 counts per minute.

When a counter of greater ultraviolet wave length selectivity is desired, for example, when it is desired to adapt the counter to be responsive almost solely to Lyman alpha radiation having a wave length of about 1216 A. the window 17 may form one wall of an absorption or gas filter cell 27 containing dry oxygen gas and having a second lithium fluoride window 17' parallel to the window 17 as illustrated in dotted outline in Figure 1. The gas within the absorption cell 27 is preferably maintained at about atmospheric pressure to reduce the stresses on the lithium fluoride windows.

Dry oxygen gas is an excellent absorber of radiation in the vacuum ultraviolet radiation range between about 1100 A. and 1750 A. and essentially transmits only Lyman alpha radiation and six other very narrow radiation bands. To insure generally complete absorption of all the ultraviolet radiation outside these radiation bands the path length between the lithium fluoride windows should be at least about one inch when the oxygen is maintained at about atmospheric pressure in the absorption cell 27.

It should be understood that an absorption cell which is separate from the counter 5 may be substituted, if desired, for the integral absorption cell 27.

The use of the cell 27 in conjunction with counter 5, as shown in Figure 1, affords an ultraviolet photon counting system which is highly selective and is highly sensitive only to ultraviolet radiation of approximately Lyman alpha wave length.

The described operating characteristics are essentially the same whether or not the absorption cell 27 is utilized in conjunction with counter 5.

Accordingly, there is provided an ultraviolet photon counter which is efficient, simple to construct and highly sensitive and selective in operation. Moreover, its durability and stability in use recommend it for a wide variety of applications. Other advantages and properties of the ultraviolet photon counter of the present invention are as hereinbefore set forth.

Various modifications in the ultraviolet photon counter of the present invention and the method of making the same as are within the skill of those versed in the art are contemplated as being within the scope of the present invention.

We claim:

1. An ultraviolet photon counter for selectively measuring radiation between 1100 A and 1280 A., comprising a generally cylindrical container having an opening in one end thereof, a lithium fluoride window disposed across that opening and sealed to said container so as to render said container gas-tight, which window passes radiation having a longer wavelength than 1100 A. and attenuates radiation having a shorter wavelength than 1100 A., an elongated wire anode extending through the end of said container opposite said window generally along the longitudinal axis of said container, the inner end of said wire being spaced from said window between about one-fourth and one times the diameter of the container, said wire having a diameter of at least about 0.04 inch, an essentially photo-insensitive cathode disposed in said container in spaced relation to said anode, and a gas mixture within said container at a pressure between about one-fourth and one atmosphere, said gas mixture comprising inert gas and iodine vapor which iodine vapor is ionized by radiation having a shorter wavelength than 1280 A. and is substantially unaffected by radiation having a longer wavelength than 1280 A., said iodine vapor being at a pressure of not less than about 0.14 mm. and not more than about 0.90 mm.

2. An ultraviolet photon counter for selectively detecting and counting radiation between 1100 A. and 1280 A., comprising a generally cylindrical container having an opening in one end thereof, a generally cylindrical absorption cell disposed across the opening and sealed to said container so as to render said container gas-tight, said cylindrical absorption cell having a lithium fluoride window at opposite ends thereof, which windows pass radiation having a longer wavelength than 1100 A. and attenuate radiation having a shorter wavelength than 1100 A., said cell containing dry oxygen which passes radiation having a longer wavelength than 1800 A. and narrow bands of radiation centered at 1216 A., 1190 A., 1166 A., 1155 A., 1145 A., 1135 A. and 1108 A., an elongated wire anode extending through the end of said container opposite said absorption cell generally along the longitudinal axis of said container, the inner end of said wire being spaced from said absorption cell between about one-fourth and one times the diameter of the container, said wire having a diameter of at least about 0.04 inch, an essentially photo-insensitive cathode disposed in said container in spaced relationship to said anode, and a gas mixture within said container at a pressure between about one-fourth and one atmosphere, said gas mixture comprising inert gas and iodine vapor, which iodine vapor is ionized by radiation having a shorter wavelength than 1280 A. and is substantially unaffected by radiation having a longer wavelength than 1280 A., said iodine vapor being at a pressure of not less than about 0.14 mm. and not more than about 0.90 mm.

References Cited in the file of this patent
UNITED STATES PATENTS

| | | |
|---|---|---|
| 2,586,836 | Liebson | Feb. 26, 1952 |
| 2,688,097 | Friedman | Aug. 31, 1954 |
| 2,714,680 | Warmoltz | Aug. 2, 1955 |

OTHER REFERENCES

Liebson et al.: "Self-Quenching Halogen-Filled Counters," Review of Scientific Instruments, v. 19, #5, pages 303–306, May 1948.

Pieper: "Instrumentation for Radioactivity," Science, v. 112, pages 377–380, Oct. 6, 1950.

Chubb et al.: "Photon Counters for the Far Ultraviolet," Review of Scientific Instruments, v. 26, #5, pages 493–498, May 1955.